United States Patent [19]

Delayaye et al.

[11] Patent Number: 4,751,733
[45] Date of Patent: Jun. 14, 1988

[54] SUBSTITUTION PERMUTATION ENCIPHERING DEVICE

[75] Inventors: Bernard Delayaye, Courbevoie; Alain Lebret, Argenteuil, both of France

[73] Assignee: Thomson-CSF, Paris, France

[21] Appl. No.: 862,949

[22] Filed: May 14, 1986

[30] Foreign Application Priority Data

May 15, 1985 [FR] France ............................. 85 07401

[51] Int. Cl.⁴ .............................................. H04L 9/02
[52] U.S. Cl. ....................................... 380/42; 380/37; 380/45; 380/50
[58] Field of Search .................................. 380/42–47, 380/50, 36, 37

[56] References Cited

U.S. PATENT DOCUMENTS

| 4,058,673 | 11/1977 | Johansson | 380/50 |
| 4,157,454 | 6/1979 | Becker | 380/42 X |
| 4,275,265 | 6/1981 | Davida et al. | 380/29 |
| 4,304,962 | 12/1981 | Fracassi et al. | 380/42 |
| 4,408,093 | 10/1983 | Place | 380/50 |
| 4,447,672 | 5/1984 | Nakamura | 380/47 X |
| 4,465,153 | 8/1984 | van de Pas et al. | 380/43 X |
| 4,638,120 | 1/1987 | Herve | 380/46 X |

OTHER PUBLICATIONS

Diffie, W. et al., "Privacy and Authentication: An Introduction to Cryptography,: Proceedings of the IEEE, vol. 67, No. 3, Mar. 1979, pp. 397–427.

Primary Examiner—Stephen C. Buczinski
Assistant Examiner—Linda J. Wallace
Attorney, Agent, or Firm—Pollock, VandeSande & Priddy

[57] ABSTRACT

A substitution-permutation enciphering device.

This device, adapted for transforming a binary word into another binary word, by a succession of substitutions and permutations, under the control of a key, is such that the substitution operations are performed by means of programmable or reprogrammable memories addressed by all or part of the word to undergo substitution, and by all or part of the key or of the parts of the key applied successively.

8 Claims, 5 Drawing Sheets

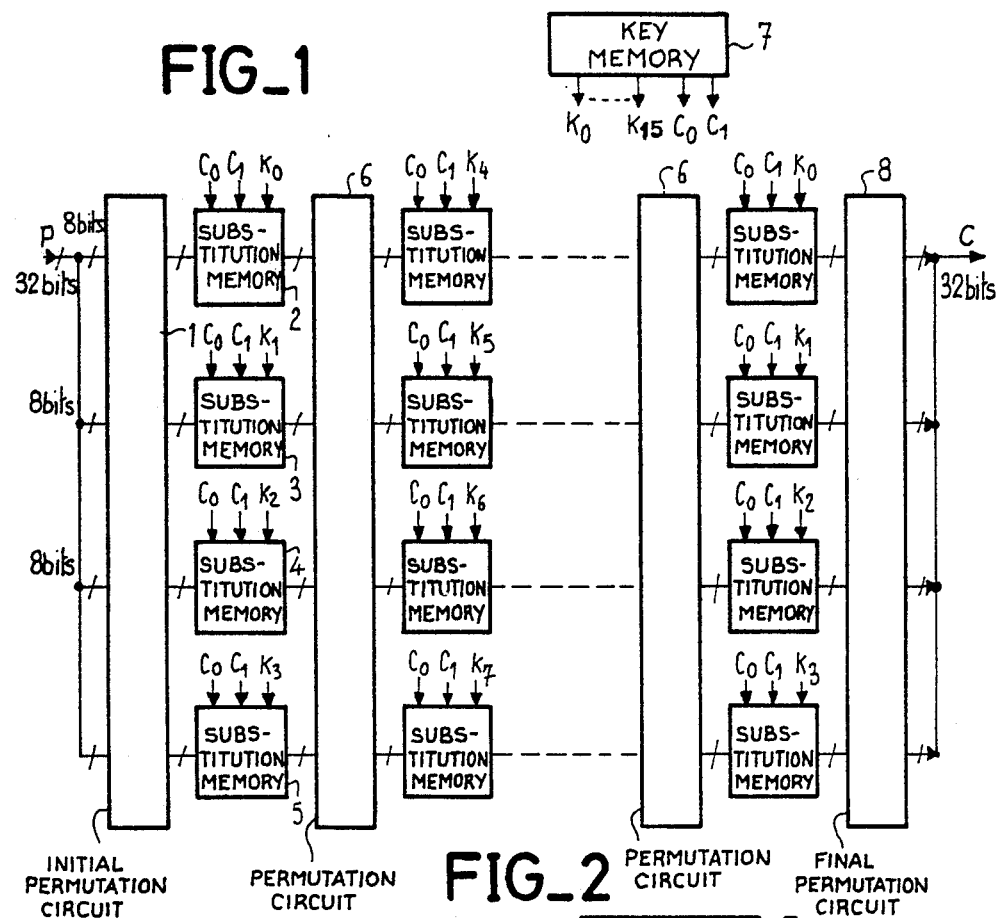
FIG_1
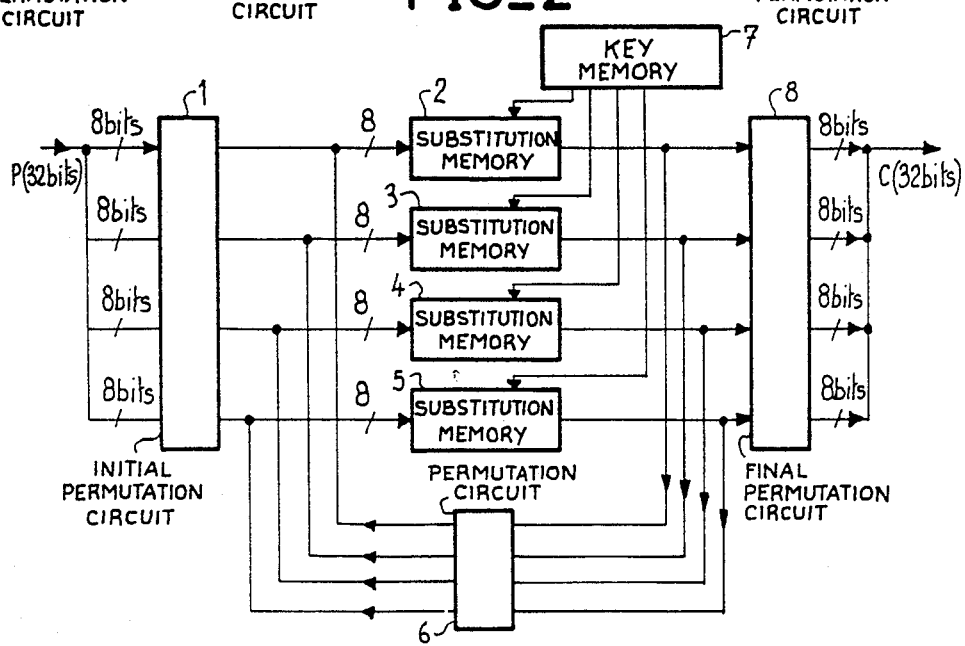
FIG_2

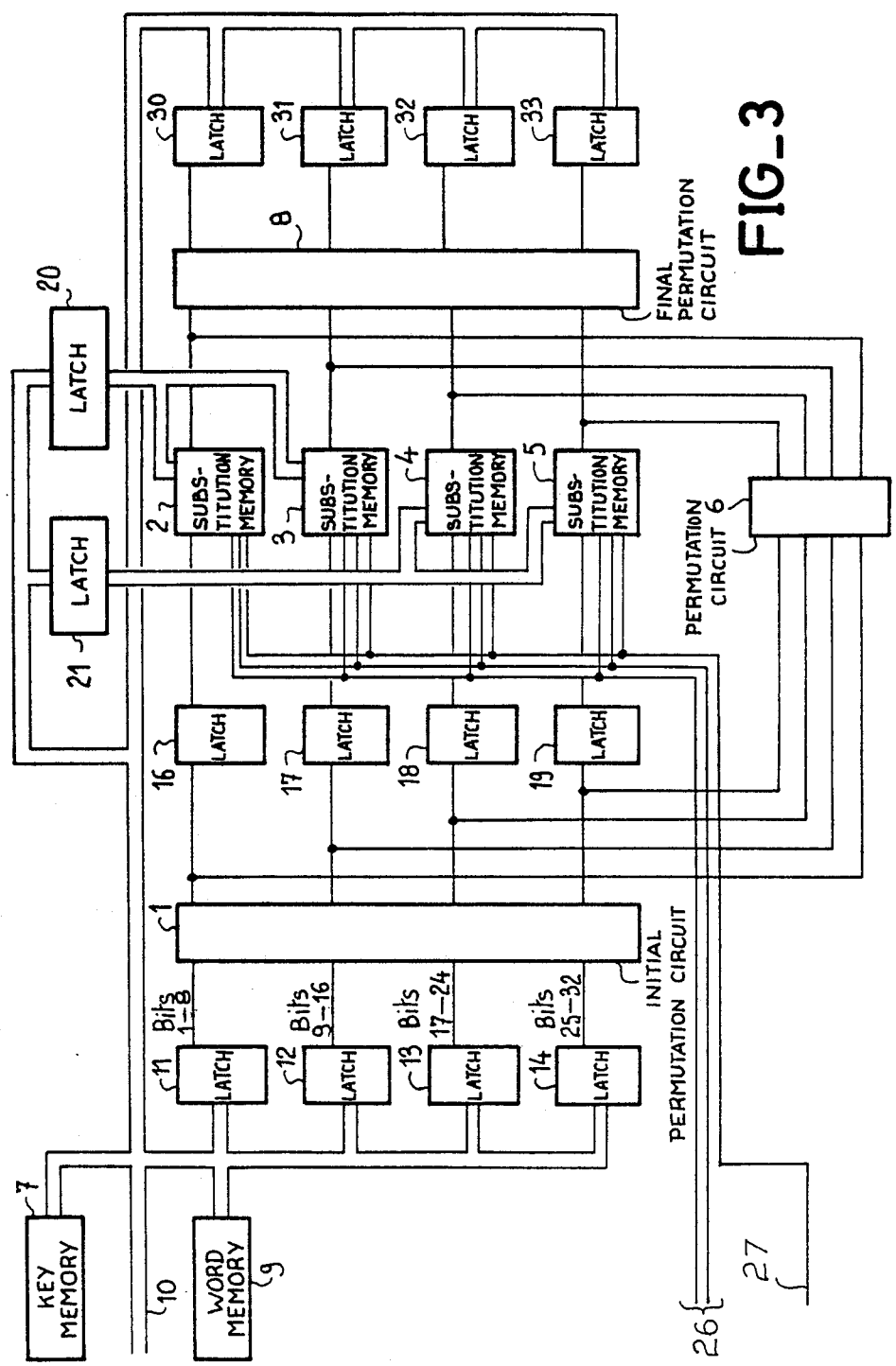

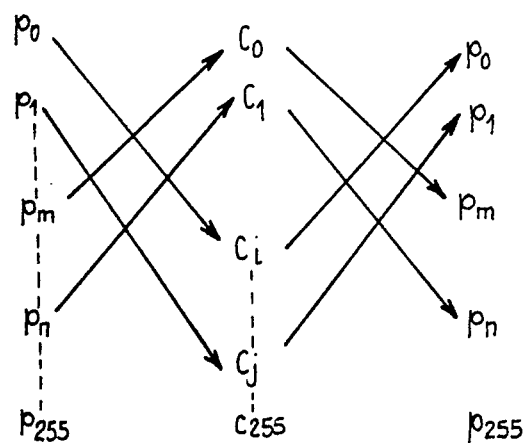
FIG_4
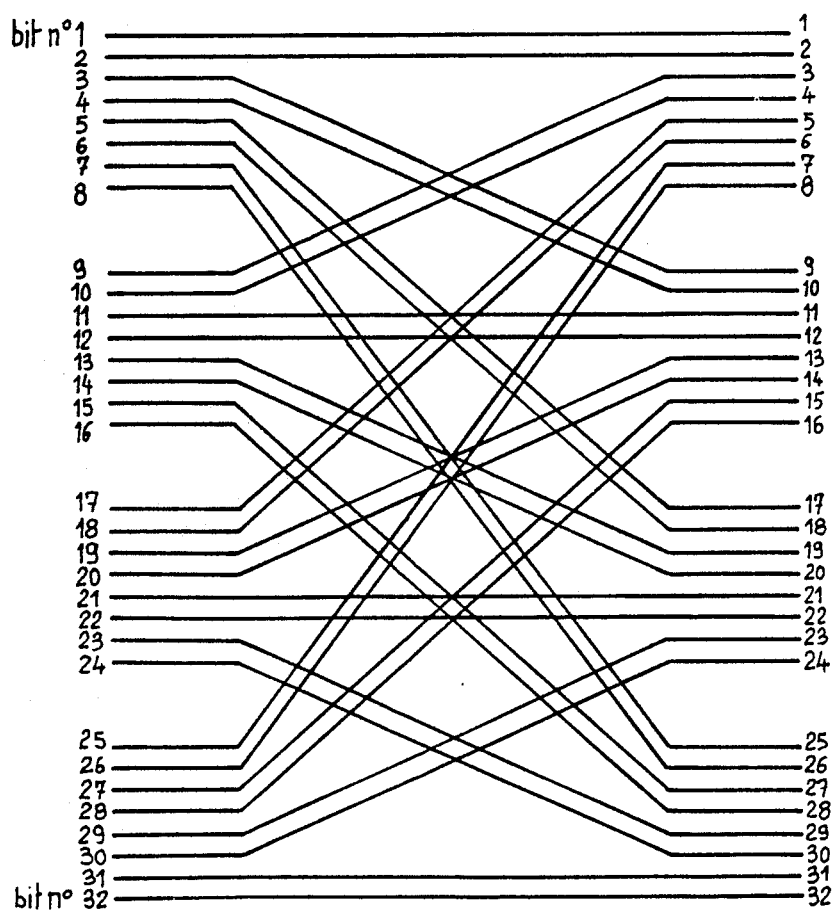
FIG_5

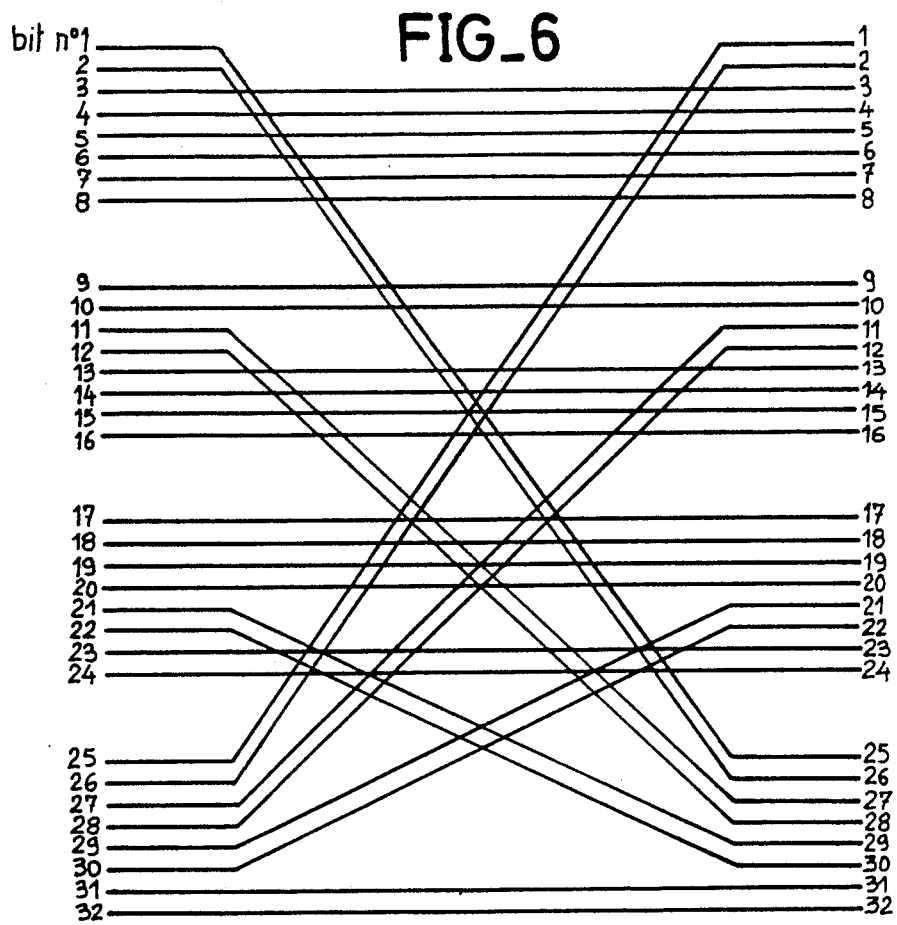
FIG_6
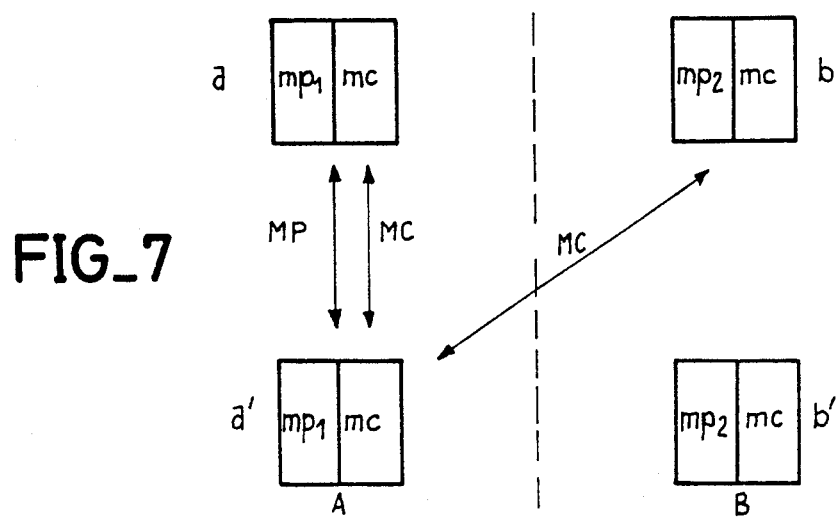
FIG_7

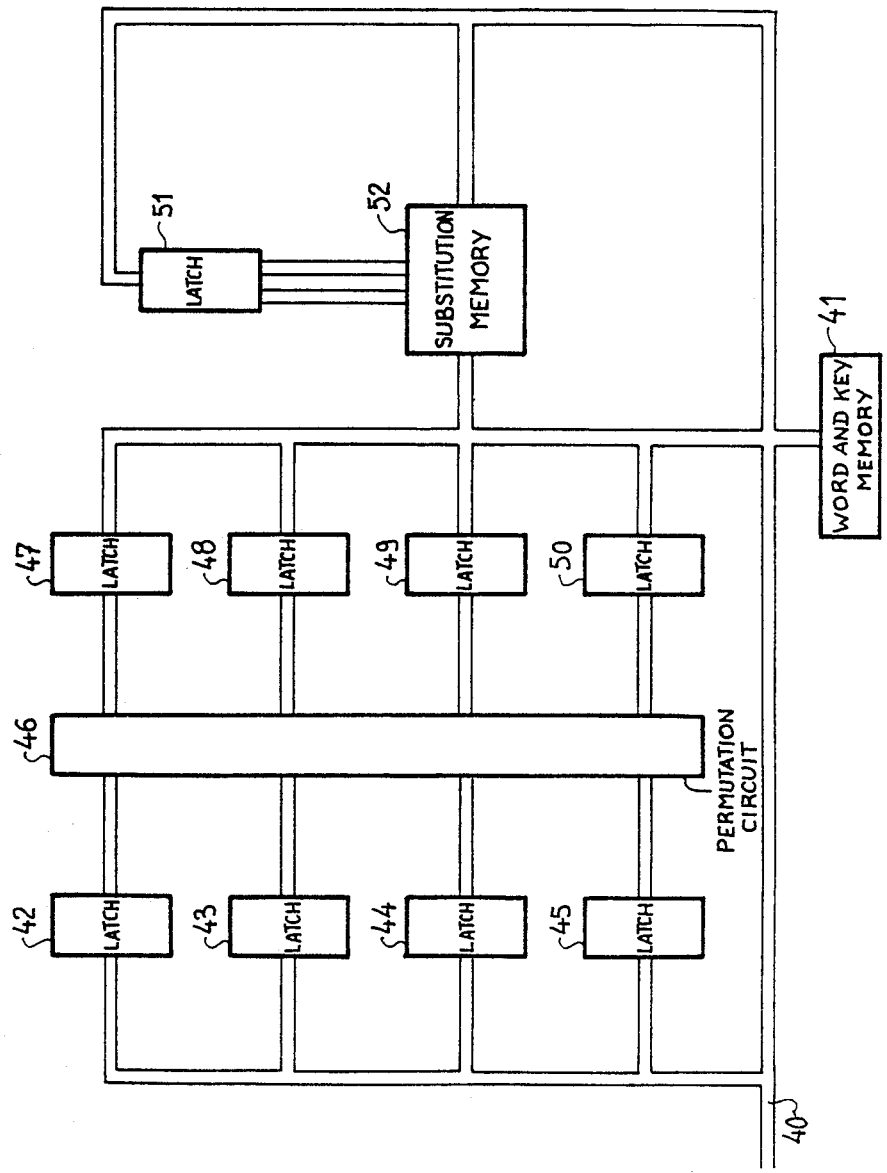
FIG_8

SUBSTITUTION PERMUTATION ENCIPHERING DEVICE

BACKGROUND OF THE INVENTION

1. Field of the Invention

The present invention relates to a ciphering device for transforming a binary word of "n" bits into another binary word of "n" bits, by the known method of substitutions-permutations. This method consists of carrying out, from the input word, a succession of substitution operations, each consisting of replacing, under the control of a key, a word of "m" bits, (generally subwords of the input word) by another word of "m" bits, and permutations which consist in permuting the bits of one word, following a predefined scheme, so as to form a new word of equal length.

2. Description of the Prior Art

One example of such a ciphering system is formed by the system known as "Data Encryption Standard". A drawback of such a system is that the law of substitution is fixed once and for all, and that all the users of such a system use the same ciphering algorithm, the only parameter variable from one user to another being the key.

The fact that the laws of substitution are fixed and known presents two types of vulnerability, the first vulnerability is that the knowledge of the key is sufficient to decipher a message, the second is that with the substitutions fixed invariable, there is no time limit for finding, by mathematical or statistical methods of analysis, possible weaknesses facilitating deciphering.

Furthermore, enciphering devices existing at the present time are applied to words and keys of well defined length, but lack flexibility for use with words or keys of different lengths.

SUMMARY OF THE INVENTION

The present invention provides an enciphering device having a greater flexibility in use, not only insofar as its possibilities of application are concerned (including more particularly personalization of the ciphering algorithm) but also with respect to the format of the words to which it applies.

The present invention provides also a device whose structure is adaptable as a function of chosen criteria such as speed or compactness.

The present invention also provides an enciphering device which is at the same time reversible, that is to say usable without any modification for transforming plain text to enciphered text and for transforming enciphered text to plain text.

The present invention provides an enciphering device, adapted for transforming a binary word into another binary word by a succession of substitutions and permutations, under the control of a key, wherein the substitution operations are essentially performed by means of one or more programmable or reprogrammable memories addressed by all or part of the word which is to undergo substitution, and by all or part of the key, or of parts of the key applied successively.

BRIEF DESCRIPTION OF THE DRAWINGS

The objects and characteristics of the present invention will become clear from the following description of embodiments, with reference to the accompanying drawings in which:

FIG. 1 is a block diagram of an enciphering device of the invention;

FIG. 2 is a variant of this diagram;

FIG. 3 is a diagram of an embodiment corresponding to the block diagram of FIG. 2;

FIG. 4 is a diagram for explaining the substitution operation;

FIG. 5 shows the diagram used for performing the permutation operation;

FIG. 6 shows the diagram used for performing the initial and final permutation operation;

FIG. 7 shows schematically one example of application of a device of the invention;

FIG. 8 is a diagram of another variant of construction of the device.

DESCRIPTION OF THE PREFERRED EMBODIMENT

By way of example, the following description is made for an input word of 32 bits and for a key of 64 bits. It is emphasized that the principle of the invention is general and independent of the numerical values chosen. For input words of greater length, the enciphering device would follow from that described hereafter by adding identical devices. For shorter input words, the device described hereafter is directly usable, by a simple particular choice of the substitutions, as will be seen further on. Similarly, for different key lengths, the enciphering device would follow from the one described hereafter by a minor modification of the sequencer.

Similarly, the general principle is independent of the size of the substitution memories, or the possible chopping up of the input word and of the key into several binary element sections, the whole of these parameters determining in particular the conditions of applications of the word undergoing substitution, and of the key, to the substitution memories, the number of substitution memories, or the number of substitution-permutation successions to be carried out successively.

The general principle is shown in FIG. 1. The input word of 32 bits is chopped into four sections of eight bits. The word undergoes first of all an initial permutation $T_0$ in an initial permutation circuit 1 (described hereafter) whose role is to adapt the device to smaller lengths of input words. Then each block of 8 bits undergoes a substitution, in a so called substitution memory (2, 3, 4, 5) which transforms it into another word of 8 bits. This substitution is provided by a random table, as will be seen further on, and is reversible, that is to say that to any word of 8 bits of the set of 256 words of 8 bits present at the input, there corresponds one and only one word of 8 bits at the output, and that to two different words at the input there correspond substituted words at the output which are different. The choice of random tables is not an absolute necessity but corresponds to a better quality of the enciphering. The substitutions for each block of 8 bits are different and controlled on the one hand by a part $K_i$, such as defined hereafter, of the key properly speaking, and on the other hand by control bits ($C_0$, $C_1$) which form in fact a key complement or auxiliary key.

The key of 64 bits is stored in a memory (7), called key memory, in the form of 16 sections of four bits which are referenced:

$$K_0 = b_0b_1b_2b_3$$
$$K_1 = b_4b_5b_6b_7 \quad \text{with } k_i = 0 \text{ or } 1$$
$$\vdots$$
$$K_{15} = b_{60}b_{61}b_{62}b_{63}$$

The substitutions applied to the different blocks of 8 bits are bijections of the set of 256 elements of the form $pn = \alpha_0, \alpha_1 \ldots \alpha_7 (\alpha_i = 0 \text{ or } 1; 0 \leq n \leq 255)$ on itself. These substitutions are called $s^i K_j$, i being the rank of the block of 8 bits on which the substitution is applied (i between 1 and 4) and Kj being the value of the section of the key (one of the 16 possible values between 0000 and 1111).

From an input block pn of 8 bits, an output block of 8 bits may thus be obtained of the form $Cn = s^i{}_{Kj} pn$. We call $s_{Kj}{}^{(-1)i}$ the reverse substitution of $s^i{}_{Kj}$, i.e. the bijection which is defined by:

$$pn = s_{Kj}{}^{(-1)i} \times Cn$$

The elements thus defined appear in the explanatory diagram of FIG. 4.

The set of four substitutions $s_{Kj}{}^1$, $s_{Kj+1}{}^2$, $s_{Kj+2}{}^3$, $s_{Kj+3}{}^4$, such as defined above form an overall substitution of a word of 32 bits by another word of 32 bits. This latter substitution is written $S_k$ and corresponds to the use of 16 key bits (Kj, Kj+1, Kj+2, Kj+3). If the 64 bit key is divided into four sections of 16 bits, the corresponding substitutions may be written $S_{k1}$, $S_{k2}$, $S_{k3}$, $S_{k4}$.

After being transformed by substitution, the word undergoes a new permutation $T_1$ (different from the initial permutation $T_0$) in a permutation circuit 6 (described subsequently), that is to say there is an exchange of the position of its bits, so as to obtain a new word of 32 bits. This permutation is homogeneous, that is to say that the bits from each byte are distributed uniformly over the four bytes after permutation. This permutation is also reciprocal, that is to say that we have $T_1 = T_1{}^{-1}$. The choice of a homogeneous permutation is not obligatory but allows a better enciphering quality to be obtained, and similarly the choice of reciprocity is not obligatory but allows the same device to be used for enciphering and deciphering.

The word obtained after permutation is subjected to a new substitution with a different 16 key bit section, then a new permutation $T_1$ and so on.

A sequencer, not shown in the figures, controls the sequencing of the operations and allows the corresponding 16 bit key section to be chosen for each substitution operation. When the four 16 bit key sections: $K'_0 = (b_0, b_1, b_2, b_3)$, $K'_1 = (b_4, b_5, b_6, b_7)$, $K'_2 = (b_8, b_9, b_{10}, b_{11})$ and $K'_3 = (b_{12}, b_{13}, b_{14}, b_{15})$ have each been used once, in a first series of four substitutions-permutations, they are again use a second time in a second series of four substitutions-permutations, for increasing the diffusion of the key bits in the enciphered word, and in a reverse and symmetrical order, which allows the same key section sequencing to be used for the enciphering operation or its reverse, without needing to reverse this sequencing.

After the last substitution, a final permutation $T_0$ takes place, identical to the initial permutation in the permutation circuit 1 and having the same function in a final permutation circuit 8. The 32 bit word obtained from this last permutation forms the output word C from the enciphering device. The whole of the operations, or enciphering algorithm, is then in the form of a succession of permutations and substitutions, and it may be written:

$$C = T_0 S_{k1} T_1 S_{k2} T_1 S_{k3} T_1 S_{k4} T_1 S_{k4} T_1 S_{k3} T_1 S_{k2} T_1 S_{k1} T_0 P$$

In this sequence, the input word of 32 bits P undergoes first of all the permutation $T_0$, then the substitution $S_{k1}$, then the permutation $T_1$, then the substitution $S_{K2}$ and so on until the final permutation $T_0$. The final word obtained is the word C.

The reverse operation is obtained by reversing the order, that is to say:

$$P = T_0 S_{k1}{}^{-1} T_1 S_{k2}{}^{-1} T_1 S_{k3}{}^{-1} T_1 S_{k4}{}^{-1} T_1 S_{k4}{}^{-1} T_1 S_{k3}{}^{-1} T_1 S_{k2}{}^{-1} T_1 S_{k1}{}^{-1} T_0 C$$

In fact, the successive application of two permutations $T_0$ or two permutations $T_1$ gives the identity operation; and the same goes for $S_{ki}{}^{-1}$ applied after $S_{ki}$.

The use of memories for storing the substitution tables, and particularly reprogrammable 32 bytes memories, provides not only for storage of the 16 substitution tables by bytes required for putting into practice the enciphering algorithm by bytes, but also the reverse substitution tables required for using the reverse algorithm (the choice between algorithm and reverse algorithm being made by means of a control bit $C_o$) and also allows several sets of substitution tables to be stored, for example four in the example considered (the choice of a given set being made by means of control bits $C_1$, two in number in the example considered).

Two particularly interesting cases of using the control bits $C_1$ may be mentioned by way of example.

The first example is the use of the device in a common mode MC, while keeping the use of a personal mode MP. This example is illustrated in FIG. 7.

Let us suppose A and B are two users of the same device, each user being formed of two or more elements, respectively a and a', b and b', between which information exchanges takes place. If these users are likely to work one day in common, they form together a common set "mc" of substitution tables. Each completes his substitution memories with a set which is proper to him, respectively "mp$_1$" and "mp$_2$". Normally, each user manages his own key, and no information may be exchanged between the elements of A and the elements of B. If an exchange decision is taken, the two users may dialogue using the same key and selecting, by means of the control bit $C_1$, the common set of substitution tables. Although using the common key, each user may however keep secret exchanges (using his own set of tables) by simple switching of the control bit $C_1$.

Another example consists of causing the contents of the substitution memories to evolve in time, thus allowing the algorithm to evolve permanently and making the task of a possible adversary appreciably more difficult. In fact, the possession of the algorithm and of the key is necessary if the adversary wishes to decipher the information exchanges. In general, the algorithm is fixed and known, or at least is likely to be so after a more or less long time. It is sufficient for the adversary to obtain the key in use at a given time, which offers all the more possibilities since its diffusion is more general; if the algorithm evolves in time, the difficulty increases.

From this point of view, the possibility of selecting another set of substitution memories may be used for masking the transitory periods for changing the contents of the previously used set, in particular in the presence of numerous users. The method consists of working alternately with two sets of tables. A first set is the set in use, the second set is the set being modified. When all of the equipment has been modified, the respective role of the sets of tables is changed.

The block diagram shown in FIG. 2 only differs from the one shown in FIG. 1 by the fact that the system loops on itself. The words obtained after the different permutations are present successively at the input of a single set of four substitution memories for undergoing therein the different substitutions, and the different key sections are successively applied to these memories in the above described order. This arrangement has the advantage of greater compactness, the preceding arrangement having the advantage of greater speed.

In FIG. 3, an embodiment has been shown corresponding to the block diagram of FIG. 2.

This diagram is limited to the heart of the system; in particular, neither the sequencer for ordering the succession of operations carried out nor addressing of the key memories and of the word memories is shown; these elements follow, however, from the description.

The system comprises first of all a word memory 9 connected to an 8-bit wide memory line 10. The memory 9 stores the 32 bit word to be converted. The system also comprises a key memory 7 connected to the same memory line 10 and in which the key has been loaded. The word and key memories are shown as two different elements but may be combined together in the same component.

In a first stage, and under the control of the sequencer (not shown), the word to be enciphered is loaded, by sub blocks of 8 bits, into buffer memories commonly called "latches" 11, 12, 13, 14. Then the 32 bit word undergoes the initial permutation $T_0$ in circuit 1. This permutation is obtained by wiring in accordance with the diagram of FIG. 6 which will be described further on. The four sub blocks of 8 bits resulting from this permutation load a second series of four latches 16, 17, 18, 19.

During this time, the sequencer has loaded the first section $K'_0$ of 16 key bits $K_0$, $K_1$, $K_2$, $K_3$ in the following way: the first byte of the key $K_0$, $K_1$ has been loaded in a latch 20 and the second byte of the key $K_2$, $K_3$ has been loaded in a latch 21.

The first four bits $K_0$ of the key are applied to the substitution memory 2, the following four $K_1$ to the substitution memory 3, the following four $K_2$ to the substitution memory 4 and the following four $K_3$ to the substitution memory 5. The substitution memories 2, 3, 4, 5 are, by way of example, reprogrammable memories with a capacity of 32 k bytes. The 15 address bits of the substitution memories are formed by the 8 bits of the input word, the 4 bits of the part of the key $K_i$ which applies thereto and 3 control bits $C_0$ and $C_1$ obtained respectively on two lines 26 and 27. One of the control devices $C_0$ is reserved, as has been seen, for the selection between the enciphering algorithm and the inverse thereof. The other two control bits $C_1$ allow a set of tables to be chosen among 4 which are available. Drawing the content of the substitution tables will be described in a subsequent development. The 8-bit words coming from the substitution tables and grouped together in a word of 32 bits then undergo permutation in circuit 6, through wiring shown in FIG. 5 which will be described subsequently. The permuted word is again loaded into latches 16, 17, 18, 19. The following section $K'_1$ of the 16 key bits ($K_4$, $K_5$, $K_6$, $K_7$) is then loaded into the latches 20 (insofar as the first byte $K_4$, $K_5$ is concerned) and 21 (insofar as the second byte $K_6$, $K_7$ is concerned). Then the bits of $K_4$ are applied to the substitution memory 2 and so on up to the bits of $K_7$ which are applied to the substitution memory 5. After a new substitution under the control of these bits, a new permutation takes place and so on.

After application of the key bits $K_{12}$ to $K_{15}$ and permutation, a new substitution takes place again with the bits $K_{12}$ to $K_{15}$, followed by a permutation-substitution with the bits $K_8$ to $K_{11}$ and so on.

When the key bits $K_0$ to $K_3$ have been applied, the resulting word undergoes a final permutation in a circuit 8, shown in FIG. 3, then is loaded into output latches 30, 31, 32, 33. These latches are connected to the memory line 10, which allows the word memory 9 to be loaded with the words thus obtained. This memory may then be read via the same memory line 10 through a system external to this device.

The choice of the contents of the substitution tables will now be described. In the general case, the substitution tables are chosen in random fashion from the whole of the 256 possible bytes. In this case, a table is formed in the following way.

For the first byte (value 0000 0000) a random drawing is made of a number chosen from 256 values between 0 and 255. The binary value of this number is the byte to be substituted for the byte 0000 0000. For the second byte, a random drawing of a number from the 255 remaining is made, after elimination of the result of the first extraction and so on up to the last byte (value 1111 1111) to which the only byte remaining after elimination of the 255 already extracted is made to correspond.

The inverse table follows immediately from the table thus described by establishing the inverse correspondances.

Each memory is loaded with four sets of sixteen tables and the inverses thereof.

It will be noted that there exist 256! ways of choosing a table. In the example shown in FIG. 3, where there are four memories, each containing sixteen tables and the inverses thereof (for the same value of the control bits), the set of tables contains 64 tables with the inverse thereof and the probability of two users falling by chance on the same programming is very small since it is $1/(256!)^{64}$.

The operation of the device will now be described for enciphering words of smaller length. The operation will be immediately understood from an example applied to a word of 28 bits.

In a first operation carried out outside the device, the word of 28 bits is completed to 32 bits by four zeros in positions 29, 30, 31, and 32.

In the permutation $T_0$, the zeros are situated in positions 21, 22 and 31, 32 (see FIG. 6).

The choice of the substitution tables of the first two memories 2 and 3 is made in the way described above, without restriction.

For the tables of substitutions of the last two memories 4 and 5, the restriction which is fixed is to keep the two zeros in the same position. For this, the 256 input words are divided into two sets. A first subset of 64 words corresponds to the words having 2 zeros in positions 21 and 22, for the third memory 31 and 32 for the last. A second subset corresponds to the 192 remaining words, the substitutions are chosen at random but remain within the subset of the word presented at the input of the table.

For two zeros at the input of the above defined positions, two zeros will therefore always be found again at the output. The permutation $T_1$ of FIG. 5 also keeps the place of the zeros (because the bits of position 21, 22 and 31, 32 are kept by this permutation), and so on up to the last substitution.

The final permutation $T_0$ of FIG. 3 re-establishes the four zeros in their original position because of the reversible character of this operation. It is then sufficient, in the system external to the device, to choose only the first 28 bits corresponding to the enciphered word.

The principle illustrated by this example can be applied without difficulty to all the words whose length is between 24 and 32 bits.

It will be noted similarly that the device may operate without modification over several different word lengths, the use of the control bits allowing a set of tables to be adapted to the length of the word.

Obvious variants may be derived for a range of different word lengths by choosing a device with permutations adapted to this restriction, and during programming of the substitution memories, sets of tables adapted to the length of the word to be enciphered. However, it will be noted that the permutation $T_1$ must be the most homogeneous possible, for allowing better diffusion of the information.

In fact, when the input word is chopped into several groups of binary elements on which separate substitution operations are then carried out, the permutation $T_1$ must be as homogeneous as possible, for allowing better diffusion of the information. Thus, if a bit changes at the input of a substitution memory, all of the output bits of this memory have an identical probability of changing. This probability must then be distributed as well as possible after permutation. The diagram of FIG. 4 corresponds to a possibility of obtaining such a result. This diagram is moreover reversible, that is to say that a bit of rank m at the output corresponds to a bit of rank n at the input and conversely.

Another embodiment, using a single substitution memory, will now be described. It is illustrated in FIG. 8. It differs from the previous device in that:

the word and key memories are grouped together in the same component;
there is no initial nor final permutation $T_0$;
depending on the operation of the sequencer, it is possible to begin either with a substitution or with a permutation;
and in particular the substitutions take place successively on the different bytes and not simultaneously.

The operation is as follows. The word in clear language and the keys are loaded through the data line 40 into memory 41. Then the word is loaded into the four latches 42 to 45, undergoes the permutation $T_1$ in a permutation circuit 46 and is stored in four latches 47 to 50. The first key section $K_0$ is loaded into a latch 51. The first byte from the latch 47 undergoes the substitution and is then stored in latch 42. Then the second key section $K_1$ is loaded into the latch 51 and the second byte from latch 48 undergoes the substitution and is stored in latch 43.

Substitution concerning the second byte may use the same table as the substitution concerning the first byte or, in variance of the device, a different table by using additional bits for addressing the substitution memory 52, controlled by the sequencer.

When the four bytes have undergone the substitution and are loaded into the latches 42 to 45, the 32-bit word thus obtained again undergoes the permutation and so on.

After the last permutation, the bytes available in the latches 47 to 50 are loaded into the word memory 41.

Although the principles of the present invention have been described above in relation to particular embodiments, it will be readily understood that said description is given solely by way of example and does not limit the scope of the invention. Among the numerous variations which could be made to the device thus described, without departing from the spirit of the present invention, the following may be mentioned by way of example:

the possibility of not applying the key directly to the substitution memories but after previous processing;
the possibility of changing the orders of the operations (permutations-substitutions instead of substitutions-permutations) or carrying out certain operations (substitutions and/or permutations) in several steps;
the possibility of constructing a system intermediate between the looped version of FIG. 2 and the split version of FIG. 1.
the possibility of carrying out any number of successions of substitutions-permutations, possibly not symmetrical;
the possibility of not carrying out the initial and final permutation.

Similarly, the definition of the means for carrying out the substitution operations of the invention may cover all the possible variants between the following "extremes":

the substitution operation carried out with a single memory, addressed by the word to be enciphered and by the key as a whole;
the substitution operation carried out with several memories, addressed respectively by parts of the word to be enciphered and by parts of the key applied successively, either within a split system such as shown in FIG. 1 or within a looped system such as shown in FIG. 2.

What is claimed is:

1. A substitution-permutation enciphering device for transforming an input binary word into another binary word by a succession of permutations and substitutions under control of a key, including:

substitution memory means for effecting said substitutions, said substitution memory means storing plural sets of substitution tables, each set corresponding to a given key value,
first addressing means for addressing said substitution memory means by at least some part of a word undergoing substitution and by at least some part of said key for selecting among said sets of substitution tables,
means storing an auxiliary key, and
second means for addressing said substitution memory means by said auxiliary key for selecting a single substitution table from that set selected by application of at least some part of said key applied to said first addressing means.

2. The device as claimed in claim 1, wherein each substitution memory means stores for a given value of the key two substitution tables, one giving a first substitution algorithm, and a second storing an inverse of said first substitution algorithm.

3. A device as recited in claim 1 which is designed for binary words of a given number of bits but which is usable with input binary words of less than said given number of bits, said device further including:
input means for concatenating said input binary word of less than said given number of bits with one or more binary zero bits to produce a modified binary word of said given number of bits,
initial and final permutation means for ensuring that bit positions containing said one or more binary zero bits in said modified binary word are identical with corresponding bit positions in said another binary word.

4. The device as claimed in claim 1, wherein said first addressing means applies the whole of the key several times, during several successive iterations of substitutions and permutations.

5. The device as claimed in claim 4, wherein said successive iterations of application of said key by said first addressing means are symmetrical.

6. The device as claimed in claim 1, wherein the input binary word is divided into groups of binary elements which device further includes permutation means including conductive wiring arranged to ensure homogeneous distribution of all of the binary elements of an input group over all output groups of said another binary word.

7. The device as claimed in claim 6, wherein said wiring is reversible.

8. The device as claimed in claim 1, wherein the substitution tables of said substitution memories are generated in random fashion.

* * * * *